United States Patent [19]

Scholl

[11] Patent Number: 6,025,415
[45] Date of Patent: Feb. 15, 2000

[54] PROCESS FOR THE PRODUCTION OF FILLED RUBBER MIXTURES

[75] Inventor: Thomas Scholl, Bergisch Gladbach, Germany

[73] Assignee: Bayer Aktiengesellschaft, Germany

[21] Appl. No.: 09/110,041

[22] Filed: Jul. 2, 1998

[30] Foreign Application Priority Data

Jul. 10, 1997 [DE] Germany .......................... 197 29 527

[51] Int. Cl.$^7$ ...................................... C08K 3/00
[52] U.S. Cl. ............................ 523/213; 524/492; 524/493
[58] Field of Search ................................... 524/492, 493; 523/213

[56] References Cited

U.S. PATENT DOCUMENTS

| | | |
|---|---|---|
| 2,477,695 | 8/1949 | Kimberlin, Jr. . |
| 2,625,492 | 1/1953 | Young . |
| 2,727,867 | 12/1955 | Denman . |
| 3,691,129 | 9/1972 | Burke, Jr. . |
| 3,873,489 | 3/1975 | Thurn et al. ............................ 260/33.6 |
| 5,166,227 | 11/1992 | Raines et al. . |
| 5,780,531 | 7/1998 | Scholl ..................................... 523/213 |

FOREIGN PATENT DOCUMENTS

| | | |
|---|---|---|
| 0 753549 | 1/1997 | European Pat. Off. . |
| 1175 875 | 4/1960 | Germany . |
| 1 229 504 | 12/1962 | Germany . |
| 2 255 577 | 11/1972 | Germany . |
| 2 141 159 | 3/1973 | Germany . |
| 2 255 577 | 6/1974 | Germany . |

*Primary Examiner*—Edward J. Cain
*Attorney, Agent, or Firm*—Connolly Bove Lodge & Hutz

[57] ABSTRACT

Mixtures of oxidic and/or siliceous fillers and rubbers are produced by adding at least one water-repellent oxidic and/or siliceous filler to the solution of a rubber in an organic solvent in quantities from 0.5 to 300 parts by weight, based on 100 parts by weight of rubber, wherein the solution of the rubber may contain other auxiliary agents for working up, processing and stabilizing as well as additional fillers, and the solvent is subsequently removed by steam distillation at temperatures from 50 to 200° C.

4 Claims, No Drawings

PROCESS FOR THE PRODUCTION OF FILLED RUBBER MIXTURES

The present invention relates to a process for the production of mixtures of solution rubbers and surface-modified oxidic or siliceous fillers, and to their use for the production of rubber vulcanisates. The rubber mixtures obtained in accordance with the new process are suitable for the production of highly reinforced, abrasion-resistant moulded articles, in particular for the production of tires that exhibit low rolling resistance and high abrasion resistance.

In comparison with rubber mixtures filled with carbon black the production of rubber mixtures filled with silica requires distinctly greater mixing energy and, moreover, usually the addition of a costly filler-activating polysulphidic silyl ether. In this connection see DE-OS 2 141 159 and 2 255 577. On the other hand, the greater mixing energy required for the incorporation of the silica could, in principle, be avoided if the silica were incorporated into a rubber solution directly after the production of the solution rubber. The precipitated silicas presently employed for the production of tires are however not suitable for such a process without pretreatment, since during the removal of the solvent with steam they are not precipitated but remain to a large extent in the aqueous phase.

U.S. Pat. No. 5,166,227 describes a process for the production of emulsion rubber mixtures filled with silica in which a dispersion of silica and a rubber latex is jointly spray-dried. This process has the disadvantage that the entire quantity of water has to be evaporated using a high amount of energy.

Rubber mixtures containing esterified silicas are described in U.S. Pat. No. 2,727,867, the mixing processes mentioned being such that the modified silica does not come into contact with water at all or only for a short time and at a low temperature, so that there is no risk of hydrolysis.

It has now been found that special water-repellent oxidic and siliceous fillers can be incorporated very easily into rubber solutions and remain in the rubber completely and in a well dispersed manner after removal of the solvent with steam. The rubber/filler masterbatches produced in this way are suitable for the production of rubber mixtures having good workability, in particular good flow behaviour and favourable vulcanisation kinetics, and for the production of highly reinforced vulcanisates, in particular tire treads having low rolling resistance and favourable raw-material costs.

The subject of the present patent application is therefore a process for the production of mixtures of oxidic and/or siliceous fillers and rubbers, which is characterised in that at least one water-repellent oxidic and/or siliceous filler is added to the solution of a rubber in an organic solvent in quantities from 0.5 to 300, preferably 0.5 to 150, parts by weight, based on 100 parts by weight of rubber, wherein the solution of the rubbers may contain other auxiliary agents for working up, processing and stabilising as well as additional fillers, and the solvent is then removed by steam distillation at temperatures from 50 to 200° C.

The term water-repellent oxidic and siliceous fillers is to be understood to mean oxidic and siliceous fillers that are not wetted by water at room temperature. Preferred fillers have a content of physically bound water of $\leq 3$ wt-%, and particularly preferably $\leq 1$ wt-%, and a "methanol wettability" of 1–60 wt-%, preferably 5–50 wt-%. "Methanol wettability" is the minimum content (in percent by weight) of methanol in a methanol/water mixture which is capable of wetting the filler.

Numerous suitable methods for rendering oxidic and siliceous fillers water-repellent are described in the literature, such as, for example, the treatment of precipitated silicas and precipitated silicates with inorganic and organic fluorides, as described in U.S. Pat. Nos. 2,477,695 and 2,625,492, or the production or aftertreatment of precipitated silicas by neutralisation of silicate solutions with organohalosilanes such as, for example, dimethyldichlorosilane, as described in DE-AS 1,229,504.

Particularly well suited are water-repellent fillers based on oxidic and siliceous fillers which (A) before, during or after a drying treatment which reduces the content of physically bound water to $\leq 3$ wt-%, have been mixed with 0.5 to 200, preferably 1 to 50, parts by weight, based on 100 parts by weight of filler, of a water-insoluble organic compound (I) or (B) before, during or after a drying treatment which reduces the content of physically bound water to $\leq 3$ wt-%, have been reacted with 0.5 to 200, preferably 1 to 50, parts by weight, based on 100 parts by weight of filler, of a compound (II) containing hydroxyl groups, with partial or total conversion of the silanol groups, or (C) before, during or after a drying treatment which reduces the content of physically bound water to $\leq 3$ wt-%, have been reacted with 0.1 to 50, preferably 0.1 to 10, parts by weight, based on 100 parts by weight of filler, of a silicon compound (III), with partial or total conversion of the silanol groups.

The process according to the invention is—as mentioned—characterised in that a rubber solution is mixed with 0.5 to 300, preferably 0.5 to 150, parts by weight (based on 100 parts by weight of rubber) of a water-repellent oxidic and/or siliceous filler and the solvent is subsequently removed preferably by steam distillation at temperatures from 50 to 200° C., optionally in a vacuum or under pressure. Other auxiliary agents for working up, processing and stabilising as well as additional fillers may be contained in the mixture consisting of rubber, solvent and filler, such as, for example, defoamers, plasticisers, anti-oxidants, filler activators and carbon black.

The water-repellent siliceous and/or oxidic fillers (A) to be used in accordance with the invention may be produced by mixing the siliceous or oxidic filler with a water-insoluble organic compound (I) before, during or after a drying process in which the water content is reduced preferably to $\leq 3$ wt-% and in particular to $\leq 1$ wt-%. The water content of the filler is understood to be the content of physically bound water that can be removed at a drying temperature of 105° C. (ISO 787/2). Suitable water-insoluble compounds (I) are, for example, unsaturated and saturated fatty acids and waxes, of the kind described in DE-OS 2 419 759, synthetic plasticisers such as dioctyl phthalate, adipic ester, modified fatty acids such as dimerised and oligomerised fatty acids, natural unsaturated oils such as olive oil, rapeseed oil, castor oil, sunflower oil, cottonseed oil, linseed oil, peanut oil and also the corresponding unsaturated and hydrogenated fatty acids and their transesterification products with monohydric to hexahydric $C_1$–$C_{20}$ alcohols such as naphthenic, paraffinic and aromatic mineral oils, water-insoluble alcohols such as, for example, octanol, dodecanol, stearyl alcohol, undecenyl alcohol and oleyl alcohol, synthetic oils such as, for example, lubricating oils based on polyester or polyether, silicone oils such as, for example, polydimethylsiloxanes, sulphur and dialkyl polysulphides such as, for example, dioctyl polysulphide, adducts of sulphur on unsaturated oils and unsaturated fatty-acid esters such as, for example, reaction products of sulphur with oleyl alcohol, olive oil, rapeseed oil or castor oil, low-molecular rubbers, in particular polybutadiene oil, low-molecular butadiene/acrylonitrile copolymer, polyisobutylene, liquid natural rubber. Furthermore, by using solvents, or in latex form, use may also be made of high-molecular rubbers such as natural rubber, butadiene rubber, stirene/butadiene rubber, acrylonitrile/butadiene rubber and thermoplastics. Preferred molecular weights are between 150 and 10,000. The compounds (I) may be applied in bulk, in solution or in latex form onto the siliceous or oxidic filler. They are preferably applied in a solvent-free manner or in the form of an aqueous dispersion. The siliceous or oxidic filler itself may be initially introduced in the form of an aqueous dispersion or as a filter cake moistened with water or in a predried form. One application method for waxes and thermoplastics to be used in accordance with the invention from aqueous dispersion during or immediately after the process for precipitating precipitated silicas is described, for example, in U.S. Pat. No. 3,607,337. Drying can be carried out for example by spray-drying, in a rotary furnace, or by means of a belt drier.

Particularly preferred compounds (I) are natural unsaturated oils such as olive oil, rapeseed oil, castor oil, sunflower oil, cottonseed oil, linseed oil, peanut oil, as well as the corresponding unsaturated and hydrogenated fatty acids and their esterification products with monohydric to hexahydric $C_1$–$C_{30}$ alcohols. The compounds (I) may be employed by themselves or in the form of mixtures.

The water-repellent siliceous and/or oxidic fillers (B) to be used in accordance with the invention can be produced by reacting the siliceous or oxidic filler with a compound (II) containing hydroxyl groups before, during or after a drying, process in which the water content is reduced to $\leq 3$ wt-%, preferably to $\leq 1$ wt-%. Preferred compounds (II) containing hydroxyl groups are 1-decanol, undecenyl alcohol, dodecanol, dodecenoic alcohol, hexadecanol, hexadecenol, octadecanol, behenyl alcohol, oleyl alcohol, ricinoleic acid, cinnamyl alcohol, castor oil, hydroxyethyl (meth)acrylate, 4-hydroxybutyl (meth)acrylate, polybutadiene oil containing hydroxyl groups with preferred OH numbers of from 20–200 (Poly BD Resins produced by Elf Atochem or Hycar HT produced by BF Goodrich), unsaturated polyesters containing hydroxyl groups with average molecular weights from 1,000 to 20,000, hydrophobic polyethers containing hydroxyl groups, such as, for example, addition products of 1–200 moles of propylene oxide per mole of alcohol.

The compounds (II) may be employed by themselves or in the form of mixtures or in the form of mixtures with the compounds (I), which are then optionally bound to the filler only physically.

The reaction of the fillers with the compounds (II) containing hydroxyl groups may be carried out in bulk or in organic solvents or in a vacuum at temperatures from above room temperature (20° C.) to below the decomposition temperature of the compounds (II) containing hydroxyl groups. For carrying, out esterification at temperatures below 100° C., a preceding heat treatment of the oxidic or siliceous filler is advisable at temperatures from 300–800° C., as described in U.S. Pat. No. 2,736,669. Otherwise, temperatures from 100° C. to below the decomposition temperature of the compound (II) containing hydroxyl groups are preferred. The oxidic or siliceous fillers may also be initially introduced in the form of products moistened with water or even in the form of a suspension in water. The residual moisture is removed from the reaction product with the water formed in the course of the reaction. Removal of the reaction water advantageously takes place immediately during the reaction or in a subsequent drying step. The success of the esterification can be determined for example by the fact that it is no longer possible for the compound (II) containing hydroxyl groups to be extracted with suitable solvents. Very particularly preferred compounds (II) containing hydroxyl groups are $C_8$–$C_{36}$ alkyl monoalcohols and $C_5$–$C_{36}$ alkyl polyols, in particular n-octyl and iso-octyl alcohol, nonanol, decanol, dodecanol, octadecyl alcohol, octadecenyl alcohol, neopentyl glycol, trimethylolpropane amd castor oil.

Suitable solvents for carrying out the surface reaction with the compounds (II) are, for example, saturated or unsaturated, aliphatic or aromatic hydrocarbons, chlorinated aliphatic or chlorinated aromatic hydrocarbons and alcohols.

The water-repellent siliceous and/or oxidic fillers (C) to be used in accordance with the invention can be produced by reacting the siliceous or oxidic filler before, during or after a drying, process, in which the water content is reduced preferably to $\leq 3$ wt-%, in particular to $\leq 1$ wt-%, with a silicon compound (III) that is reactive to Si-OH groups in the filler. The silicon compounds (III) to be used are alkoxysilanes such as, for example, tetramethoxysilane and tetraethoxysilane, alkylalkoxysilanes such as octyltrimethoxysilane and octyltriethoxysilane, octadecyltriethoxysilane, dimethyldiethoxysilane, trimethylethoxysilane, polydimethylsiloxanes with reactive Si-OH groups and with reactive alkoxysilyl ether groups such as, for example, methoxy and ethoxy radicals, cyclic dimethylsiloxane ethers such as octamethylcyclotetrasiloxane, trimethylsilyl amines such as hexamethyldisilazane or sulphur-containing silyl esters, in particular bis-(trialkoxysilyl-alkyl)-polysulphides of the kind described in DE 2 141 159 and DE-AS 2 255 577, the oligomeric and/or polymeric sulphur-containing silyl ethers of DE-OS 4 435 311 and EP-A 670,347, mercaptoalkyltrialkoxysilanes, in particular mercaptopropyltriethoxysilane and thiocyanatoalkylsilyl ethers, of the kind described for example in DE-OS 19 544 469. Bis-(triethoxysilylpropyl)-tetrasulphide, the corresponding disulphide, as well as polysulphides according to EP 670, 347, prepared from chloropropyltriethoxysilane, dichloroalkanes and sodium polysulphide, the oligo- or poly(4-(2-triethoxysilylethyl)cyclohexane-1,2-diyl)-bisoligosulphides of DE 4 435 311, and thiocyanatopropyltriethoxysilane are particularly preferred.

The reaction temperatures are between room temperature and the decomposition temperature of the silicon compound. The reaction may optionally be accelerated by acidic or alkaline catalysts. Examples of these are ammonia and sodium alcoholate.

The water-repellent fillers are not wetted by water and have methanol wettabilities of 1 to 60%, preferably 5 to 50%. The methanol wettability represents the proportion by weight of methanol in a methanol/water mixture which is just sufficient to wet the filler. The determination of methanol wettability is carried out as follows:

200 mg of silica and 50 ml of water are introduced into a 250 ml round-bottomed flask equipped with a magnetic stirrer. The (partially) water-repellent silica remains on the surface of the water. Then the tip of a measuring pipette filled with methanol is immersed in the liquid phase (in order to avoid direct contact with the silica) and the methanol is allowed to flow in slowly, during which the liquid is stirred with the magnetic stirrer in such a manner that a vortex forms in the liquid. Methanol is added until the solid substance is wetted, which is the case when the silica is no longer distributed over the entire surface of the liquid phase (already containing methanol) and the relatively transparent film-free liquid becomes visible.

Analysis: The methanol wettability is expressed in wt-% of methanol in the methanol/water mixture, according to the following formula:

methanol wettability (in % by weight)=(0.79×the number of ml of MeOH/0.79×the number of ml of MeOH+50)×100

Oxidic and siliceous fillers are understood to be all known natural or synthetic fillers of the appropriate type. These are, for example, precipitated or pyrogenic silica, aluminium hydroxide, aluminium silicate, calcium silicate, calcium sulphate, china clay and calcined clay.

Particularly preferred are:

highly dispersed silicas, produced for example by the precipitation of solutions of silicates or by flame hydrolysis of the silicates, of silicon halides with specific surface areas from 5–1,000, preferably 20–400 $m^2/g$ (BET surface area) and with primary particle sizes from 10–400 nm. The silicas may optionally also be present in the form of mixed oxides with other metal oxides such as Al, Mg, Ca, Ba, Zn, Zr and Ti oxides;

synthetic silicates such as aluminium silicate, alkaline-earth silicates such as magnesium silicate or calcium silicate, with BET surface areas from 20–400 $m^2/g$, and primary particle diameters from 10–400 nm;

natural silicates such as kaolin and other naturally occurring silicas;

glass fibres and glass-fibre products (mats, strands) or glass microbeads;

metal oxides such as zinc oxide, calcium oxide, magnesium oxide, aluminium oxide;

metal carbonates such as magnesium carbonate, calcium carbonates, zinc carbonate; and metal hydroxides such as aluminium hydroxide, magnesium hydroxide.

Suitable in principle for the production of in particular, non-black filled rubber mixtures by the process according to the invention are all rubbers from which solutions can be produced in organic solvents. These include natural rubber and synthetic rubbers. Preferred synthetic rubbers are described, for example, in W. Hofmann, Kautschuktechnologie, Gentner Verlag, Stuttgart 1980. They comprise, inter alia, BR—polybutadiene
ABR—butadiene/acrylic acid $C_{1-4}$ alkyl ester copolymers
CR—polychloroprene
IR—polyisoprene
SBR—styrene/butadiene copolymers with stirene contents from 1 to 60, preferably 20 to 50, wt-%
IIR—isobutylene/isoprene copolymers
NBR—butadiene/acrylonitrile copolymers with acrylonitrile contents from 5 to 60, preferably 10 to 40, wt-%
HNBR—partially hydrogenated or filly hydrogenated NBR rubber
EPDM—ethylene/propylene/diene copolymers and also mixtures of these rubbers. Of interest for the production of motor-vehicle tires with the aid of the surface-modified fillers are, in particular, natural rubber, emulsion SBR as well as solution SBR rubbers with a glass transition temperature above –50° C. which may optionally be modified with silyl ethers or other functional groups, such as are described, for example, in EP-A 447 066, polybutadiene rubber with a high 1,4-cis content (>90%) which is produced with catalysts based on Ni, Co, Ti or Nd, as well as polybutadiene rubber with a vinyl content from 0–75% as well as mixtures thereof.

The new process is particularly advantageously suitable for the production of non-black filled solution SBR and solution polybutadiene mixtures, since these can be processed further in the same solvent after production and display particularly advantageous tire-related properties.

The process according to the invention is carried out by mixing a rubber solution with 0.5 to 300, preferably 0.5 to 150, parts by weight (based on 100 parts by weight of rubber) of a water-repellent oxidic or siliceous filler and subsequently removing the solvent by steam distillation at temperatures from 50–200° C., optionally in a vacuum or under a pressure of from 0 to 10 atm. Other auxiliary agents for working up, processing and stabilising as well as other fillers may be contained in the mixture consisting of rubber, solvent and filler, such as, for example, defoamers, plasticisers, anti-oxidants, filler activators and carbon black.

In a particularly preferred embodiment of the process according to the invention the dissolved rubber may be coagulated in water during removal of the solvent, for example by introducing the rubber solution dropwise into hot water or by joint atomisation of the rubber solution with steam and precipitation in water.

Particularly suitable solvents for dissolving the rubbers employed in accordance with the invention are aliphatic, cycloaliphatic and aromatic solvents. Hydrocarbons with 2 to 12 carbon atoms are particularly preferred, such as n-butane, iso-butane, n- and iso-pentane, hexane, cyclohexane, propene, 1-butene, trans-2-butene, 1-pentene, 2-pentene, 1-hexene, 2-hexene, benzene, toluene, xylene and ethylbenzene. The solvents may be used individually or in the form of mixtures.

The content of rubber in the solution is 0.5 to 50 wt-% and is limited, above all, by the viscosity of the solution. For economic reasons the content of rubber should be as high as possible. Particularly preferred concentrations are 5 to 35 wt-% rubber.

Particularly preferred contents of water-repellent filler (A, B, C) are—as mentioned—20 to 125 parts by weight per 100 parts by weight of rubber.

In order to improve flowability it is also advisable to add a plasticiser, in particular a paraffinic, naphthenic or aromatic plasticiser, in quantities from 1 to 100 parts by weight, based on 100 parts by weight of rubber. Aromatic plasticisers are particularly preferably used in quantities from 5 to 50 parts by weight.

The rubber solutions may also contain other auxiliaries, such as filler activators, such as for example bis-(triethoxysilylpropyl) disulphide and tetrasulphide and the sulphur-containing silyl ethers of EP-A 466,066 and EP-A 670,347, thiocyanatopropyl-triethoxysilane and mercaptopropyltriethoxysilane, as well as defoamers and antioxidants. Fillers such as carbon blacks or rubber gels can also be added to the rubber solution in quantities of up to 100 parts by weight per 100 parts of rubber. The additional auxiliaries and fillers can be added as such or in the form of aqueous dispersions.

For the production of rubber vulcanisates from the rubber mixtures (masterbatches) according to the invention, additional rubbers—corresponding to those mentioned above—and rubber auxiliary products may also be added, in particular other diene rubbers, reaction accelerators, anti-ageing agents, heat-stabilising agents, light-screening agents, antiozonants, processing aids, plasticisers, tackifiers, foaming agents, dyestuffs, pigments, waxes, extenders, organic acids, retarding agents, metal oxides as well as activators such as triethanol amine, polyethylene glycol, hexanetriol, trimethylolpropane or sulphur-containing silyl ethers known in the rubber industry. Additional fillers can also be added to the rubber mixtures. These include not only water-repellent and non-water-repellent oxidic or siliceous fillers, corresponding to those already mentioned, but also carbon blacks. The carbon blacks to be used are produced by the flame soot, furnace black or gas black process and have BET surface areas of 20 to 200 m²/g, such as for example SAF, ISAF, HAF, FEF or GPF carbon blacks. Rubber gels, in particular those based on polybutadiene, polychloroprene, NBR or SBR rubber, can also be added to the rubber mixtures as additional fillers.

Particularly preferred rubber mixtures contain not only rubber, filler and additional rubber auxiliaries but also 0.5 to 15 parts by weight, based on 100 parts by weight of rubber, of sulphur-containing silyl ethers as filler activators, and in particular bis-(trialkoxysilylalkyl)-polysulphides, of the kind described in DE 2,141,159 and DE-AS 2,255,577, oligomeric and/or polymeric sulphur-containing silyl ethers of DE-OS 4,435,311 and EP-A 670,347, mercaptoalkyltrialkoxysilanes, in particular mercaptopropyltriethoxysilane, and thiocyanatoalkylsilyl ethers, of the kind described for example in DE-OS 19,544, 469.

The following are very particularly preferred: bis-(triethoxysilylpropyl)-tetrasulphide, the corresponding disulphide, and polysulphides according to EP 670,347 prepared from chloropropyltriethoxysilane, dichloroalkanes and sodium polysulphide, oligo- or poly-(4-(2-triethoxysilylethyl)cyclohexane-1,2-diyl)-bisoli(osulphides of DE 4,435,311 and thiocyanatopropyltriethoxysilane. The abovementioned compounds are also surprisingly highly effective even after the oxidic and siliceous fillers have been rendered water-repellent.

The rubber auxiliary agents are employed in conventional quantities which depend, inter alia, on the intended use. Conventional quantities are, for example, quantities from 0.1 to 50 wt-%, based on the total quantity of rubber.

Cross-linking agents which may be used in the production of rubber vulcanisates are sulphur, sulphur donors or peroxides. The rubber mixtures according to the invention may furthermore contain vulcanisation accelerators. Examples of suitable vulcanisation accelerators are mercaptobenzthiazoles, guanidines, thiurams, dithiocarbamates, thioureas and thiocarbonates. The cross-linking accelerators and sulphur or peroxides are employed in quantities from 0.1 to 10 wt-%, preferably 0.1 to 5 wt-%, based on the total quantity of rubber.

Blending of the non-black filled rubber mixtures according to the invention with other rubbers and rubber auxiliary agents can be carried out in conventional mixing units such as rollers, internal mixers and mixing extruders.

Vulcanisation can be carried out at temperatures from 100–200° C., preferably 130 to 180° C., optionally under a pressure offrom 10–200 bar.

The rubber mixtures according to the invention and the vulcanisates produced therefrom are suitable for the production of moulded articles, such as for example for the production of cable sheaths, hoses, drive belts, conveyor belts, roller coverings, tires, shoe soles, packing rings and damping, elements and quite particularly for the production of tire treads having low rolling resistance.

EXAMPLES

Example 1
Silica Surface-Treated with Oleyl Alcohol 500 g Vulkasil S (highly active precipitated silica with a BET surface area of 180 m²/g, produced by Bayer AG, contains about 5 wt-% water) and 50 g oleyl alcohol are heated for 4 hours with stirring to 200–220° C., during which 33 g water distil off. 517 g of a white powder are obtained. The silica modified in this way is not wetted by water. Methanol wettability: 27 wt-%.

Example 2
Silica Surface-Treated with Undecenyl Alcohol 500 g Vulkasil S (highly active precipitated silica with a BET surface area of 180 m²/g, produced by Bayer AG) and 50 g 10-undecene-1-ol alcohol were heated with stirring for 4 hours to 200–220° C., 25 of distillate being collected. Undecenol that had distilled over (2 g) was recirculated into the reaction. 515 g of a white powder were obtained. The silica modified in this way is not wetted by water. Methanol wettability: 36 wt-%.

From 20 g of this product it was possible to extract 0.6 g of oil with 500 ml toluene in a Soxleth apparatus by refluxing for 15 hours.

Example 3
Silica Surface-Treated with Stearyl Alcohol 500 g Vulkasil S (highly active precipitated silica with a BET surface area of 180 m²/g, produced by Bayer AG) and 50 g stearyl alcohol were heated with stirring for 4 hours to 200–220° C., 21 g water being collected. 522 g of a colourless powder were obtained. The silica modified in this way is not wetted by water. Methanol wettability: 36 wt-%.

Example 4
Silica Surface-Treated with Olive Oil 300 g Vulkasil S (highly active precipitated silica with a BET surface area of 180 m²/g, produced by Bayer AG) and 30 g olive oil are heated for 4 hours to 200–220° C., 13 g water being collected. 313 g of a colourless powder were obtained. The silica modified in this way is not wetted by water. Methanol wettability: 11 wt-%.

Example 5
Silica Surface-Treated with Castor Oil and Silane 500 g of Vulkasil S (a highly active precipitated silica with a BET surface area of 180 m²/g from Bayer AG), 50 g of castor oil and 5 g of bis-(triethoxysilylpropyl)-tetrasulphide (Si 69, Degussa AG) are heated to 170° C. for 7 hours with stirring, during which water and ethanol are distilled off. 532 g of a light brown powder were obtained. The silica thus modified is not wetted by water. Methanol wettability: 15 wt-%.

Example 6
Silica Surface-Treated with Castor Oil 550 g of Vulkasil S (a highly active precipitated silica with a BET surface area of 180 m²/g from Bayer AG) and 27.5 g of castor oil were heated in a three-necked flask equipped with a stirrer and a distillation bridge in an oil bath to an oil bath temperature of 200° C. with stirring for four hours, during which water was distilled off. 546 g of a white powder were obtained. In contrast to the starting product, the silica rendered water-repellent by this method is not wetted with water and has a methanol wettability of 15 wt-%.

Examples 7+8
Production of Silica/Solution-Rubber Mixtures

Example 7a
Solution SBR/Silica According to Example 4

200 g of solution styrene/butadiene rubber Buna VSL 4020-0 (Bayer AG) with a content of bound styrene of 20 wt-% and a content of 1,2-vinyl of 40 wt-% as well as 1 g Vulkanox BKF (phenolic anti-oxidant, Bayer AG) were dissolved in 2 l cyclohexane. Then 200 g of the surface-modified silica from Example 4 were added and this suspension was added dropwise, with stirring, into 2 l of water preheated to 70° C., during which steam (100–110° C.) was simultaneously introduced. Duration: 2 hours. When the addition of the rubber/silica suspension was complete, steam was introduced for a further 20 minutes. After separation a damp, crumbly product was obtained, in which the silica was uniformly surrounded by rubber. The dried yield was 386 g (96%).

Example 7b (Comparative Example)
Solution SBR/Untreated Precipitated Silica

The procedure specified in Example 6a was followed, except that 200 g of an (unmodified) highly active precipitated silica with a BET surface area of 180 m$^2$/g (Vulkasil S, Bayer AG) was employed instead of the modified silica from Example 4. Result: the waste water was intensely clouded and a large proportion of the silica had been deposited therein. This silica was not uniformly distributed in the mixture—on the contrary, large portions were not surrounded by rubber. The yield was 227 g (57%).

Example 8a
Solution SBR/Silica According to Example 1 (100 phr)

200 g of solution styrene/butadiene rubber Buna VSL 4020-0 (Bayer AG) with a content of bound styrene of 20 wt-% and a content of 1,2-vinyl of 40 wt-% and also 1 g Vulkanox BKF (phenolic anti-oxidant produced by Bayer AG) are dissolved in 2 l cyclohexane. Then 200 g of surface-modified silica from Example 1 are added and further stirring is carried out for 45 minutes at 70° C. for the purpose of homogenisation and the solvent is then expelled with steam of a temperature of 100–110° C. A crumbly, moist product is obtained in which the silica is uniformly surrounded. The waste water is clear and free from solid particles. After drying (70° C. in a vacuum), 399.6 g of a rubber/silica masterbatch remain.

If the same procedure is followed and the 200 g of the silica according to Example 1 are replaced by the stated quantity of another silica, the following results are obtained:

| Example | Silica | Quantity | Product | Waste-water quality |
| --- | --- | --- | --- | --- |
| Example 8b | acc. to Ex. 2 | 200 g | 400 g (100%) homogeneous | clear, without solids |
| Example 8c | acc. to Ex. 3 | 200 g | 398 g (99.5%) homogenous | clear, without solids |
| Example 8d | acc. to Ex. 4 | 200 g | 398 g (99.5%) homogeneous | clear, without solids |
| Comparison A | Vulkasil S | 200 g | 334 g (83%) very inhomogeneous | cloudy, large quantities of silica |

Example 8e
Solution SBR/Silica According to Example 1/Aromatic Plasticiser 200 g of solution styrene/butadiene rubber Buna VSL 4020-0 (Bayer AG) and 1 g Vulkanox BKF (phenolic anti-oxidant, Bayer AG) were dissolved in 2 l cyclohexane. Then 75 g of aromatic mineral oil Renopal 450 (Fuchs Mineralölwerke) and 200 g of the water-repellent silica according to Example 1 were added and stirring was carried out for 45 minutes at 70° C. Then the solvent was distilled off with steam of a temperature of 100–110° C. A brown, crumbly product remained, in which the silica was present in a uniformly distributed manner. The waste water was clear and free from solids. After drying, 474 g (99.6%) of a homogeneous rubber/filler mixture remained.

Example 8f
Oil-Extended L-SBR/Silica According to Example 6

Using the same procedure as described in Example 8e, 400 g of the silica according to Example 6 were stirred into a solution of 687.5 g of an oil-extended rubber, Buna VSL 5025-1 (Bayer AG), 2.5 g of Vulkanox BKF (Bayer AG) in 4 l of cyclohexane. After steam distillation and drying, 1080 g (99.1%) of an oil-extended rubber/filler mixture (100 phr of rubber/80 phr treated silica/37.5 phr oil) with a Mooney viscosity ML 1+4 (100° C.) of 178 were obtained. The waste water after the steam distillation was transparent and free from silica.

Example 9

The following rubber mixtures were produced in a 300 ml kneader at 130° C. with a mixing time of 5 minutes. Sulphur and accelerator were subsequently added on the roller at 50° C. The stated quantities relate to parts by weight.

|  | A | B |
| --- | --- | --- |
| BR rubber Buna CB 24 (Bayer AG) | 25 | 25 |
| Silica Vulkasil S (Bayer AG) | 5 | 5 |
| Silica/solution SBR masterbatch acc. to Ex. 8a | 150 | 0 |
| Silica/solution SBR masterbatch acc. to Ex. 8b | 0 | 150 |
| Carbon black Corax 339 (Degussa) | 6.5 | 6.5 |
| Aromat. oil | 32.5 | 32.5 |
| Zinc oxide | 2.5 | 2.5 |
| Stearic acid | 1 | 1 |
| Anti-oxidant Vulkanox 4020 (Bayer AG) | 1 | 1 |
| Antiozonant wax Antilux 654 (Rheinchemie) | 1.5 | 1.5 |
| Silane Si 69 (Degussa) | 6.5 | 6.5 |
| Sulphur | 1.5 | 1.5 |
| Accelerator Vulkacit CZ (Bayer AG) | 1.5 | 1.5 |
| Accelerator Vulkacit D (Bayer AG) | 2 | 2 |
| Mixing viscosity ML 1 + 4 (100° C.) | 49 | 48 |

The rubber mixtures were subsequently vulcanised for 35 minutes at 160° C. to form plates 1 mm thick.

The following mechanical properties were obtained:

|  | A | B |
| --- | --- | --- |
| Elongation at break (%) | 515 | 595 |
| Tensile strength (MPa): | 18.0 | 18.7 |
| Modulus at 100% elongation (MPa): | 2.0 | 2.0 |
| Modulus at 300% elongation (MPa): | 8.0 | 7.0 |

Example 10

The following rubber mixture was produced in a 1.5 kneader at 130° C. for a mixing period of 5 minutes. The sulphur and the accelerator were then added to the roller at 50° C. The stated quantities refer to parts by weight.

|  | A |
| --- | --- |
| Oil-extended rubber/silica mixture according to Example 8f | 217.5 |
| Carbon black Corax 339 (Degussa) | 6.5 |
| Zinc oxide | 2.5 |
| Stearic acid | 1 |
| Antioxidant Vulkanox 4020 (Bayer AG) | 1 |
| Antiozonant Antilux 654 (Rheinchemie) | 1.5 |

-continued

| | A |
|---|---|
| Silane Si 69 (Degussa) | 6.5 |
| Sulphur | 1.5 |
| Accelerator Vulkacit CZ (Bayer AG) | 1.5 |
| Accelerator Vulkacit D (Bayer AG) | 2 |
| Mixing viscosity ML 1 + 4 (100° C.): | 82 |

The rubber mixtures were then vulcanised at 160° C. for 35 minutes.

The following mechanical properties were obtained:

| | A |
|---|---|
| Elongation at break (%): | 398 |
| Tensile strength (Mpa): | 17.3 |
| Modulus at 100% elongation (Mpa): | 3.4 |
| Modulus at 300% elongation (Mpa): | 12.6 |
| Rebound resilience at 23° C. (%) | 14 |
| Rebound resilience at 70° C. (%) | 45 |
| (Shore A) hardness at 23° C. | 72 |
| (Shore A) hardness at 70° C. | 66 |
| Abrasion according to DIN 53,516 (ccm) | 113 |

I claim:

1. A process for the production of mixtures of oxidic and/or siliceous fillers and rubbers, characterised in that at least one water-repellent oxidic and/or siliceous filler is added to the solution of a rubber in an organic solvent in quantities from 0.5 to 300 parts by weight, based on 100 parts by weight of rubber, wherein the solution of the rubbers may contain other auxiliary agents for working up, processing and stabilising as well as additional fillers, and the solvent is subsequently removed by steam distillation at temperatures from 50 to 200° C.

2. A process according to claim 1, characterised in that oxidic and/or siliceous fillers are used which are not wetted by water at room temperature and have a methanol wettability of 1 to 60.

3. A process according to claim 1, characterised in that the rubber employed is a solution-polymerised polybutadiene, stirene/butadiene copolymer, isobutylene/isoprene copolymer, ethylene/propylene/diene copolymer or polyisoprene.

4. A process according to claim 1, characterised in that oxidic and/or siliceous fillers are used which (A) before, during or after a drying treatment which reduces the content of physically bound water to $\leq 3$ wt-%, have been mixed with 0.5 to 200 parts by weight of a water-insoluble organic compound (I) or (B) before, during or after a drying treatment which reduces the content of physically bound water to $\leq 3$ wt-%, have been reacted with 0.5 to 200 parts by weight of a compound (II) containing hydroxyl groups, with partial or total conversion of the silanol groups, or (C) before, during or after a drying treatment which reduces the content of physically bound water to $\leq 3$ wt-%, have been reacted with 0.1 to 50 parts by weight, in each case based on 100 parts by weight of filler, of a silicon compound (III), with partial or total conversion of the silanol groups.

* * * * *

UNITED STATES PATENT AND TRADEMARK OFFICE
CERTIFICATE OF CORRECTION

PATENT NO. : 6,025,415
DATED : February 15, 2000
INVENTOR(S) : Thomas Scholl

It is certified that error appears in the above-identified patent and that said Letters Patent is hereby corrected as shown below:

Column 7, line 24, "bisoli(osulphides" should read - - bisoligosulphides - -; and line 49, "'offrom" should read - - of from - -.

Column 8, line 6, "25 of" should read - - 25 g of - -.

Signed and Sealed this

Sixth Day of February, 2001

Attest:

Q. TODD DICKINSON

*Attesting Officer*          *Director of Patents and Trademarks*